US012709295B2

(12) United States Patent
Rehr et al.

(10) Patent No.: US 12,709,295 B2
(45) Date of Patent: Aug. 18, 2026

(54) MOTION PLANNING OF AN AUTONOMOUS VEHICLE, MOTION PLANNING SYSTEM AND VEHICLE WITH A MOTION PLANNING SYSTEM

(71) Applicants: CARIAD SE, Wolfsburg (DE); Volkswagen Aktiengesellschaft, Wolfsburg (DE)

(72) Inventors: Anna Rehr, Freising (DE); Simon Grossjohann, Wolfsburg (DE)

(73) Assignees: CARIAD SE, Wolfsburg (DE); VOLKSWAGEN AKTIENGESELLSCHAFT, Wolfsburg (DE)

( * ) Notice: Subject to any disclaimer, the term of this patent is extended or adjusted under 35 U.S.C. 154(b) by 125 days.

(21) Appl. No.: 18/572,153

(22) PCT Filed: Jun. 24, 2021

(86) PCT No.: PCT/EP2021/067362
§ 371 (c)(1),
(2) Date: Dec. 19, 2023

(87) PCT Pub. No.: WO2022/268323
PCT Pub. Date: Dec. 29, 2022

(65) Prior Publication Data

US 2024/0199077 A1 Jun. 20, 2024

(51) Int. Cl.
*B60W 60/00* (2020.01)

(52) U.S. Cl.
CPC ............................... *B60W 60/0011* (2020.02)

(58) Field of Classification Search
CPC ......... B60W 60/0011; B60W 2556/50; B60W 2754/10
See application file for complete search history.

(56) References Cited

U.S. PATENT DOCUMENTS

2016/0375901 A1 12/2016 Di Cairano et al.
2020/0159233 A1 5/2020 Zhang et al.
(Continued)

FOREIGN PATENT DOCUMENTS

DE 102016212292 A1 8/2017

OTHER PUBLICATIONS

McNaughton, "Parallel Algorithms for Real-time Motion Planning," The Robotics Institute, Jul. 1, 2011, 233 pages.

*Primary Examiner* — Ryan Rink
(74) *Attorney, Agent, or Firm* — Seed Intellectual Property Law Group LLP

(57) ABSTRACT

A motion planning system and method for motion planning of an autonomous vehicle are provided, wherein a motion planning system determines a plurality of configuration samples through a configuration space, wherein the configuration samples are determined in predefined sampling steps, wherein a sequence of configuration samples defines a possible trajectory of the vehicle in the configuration space, wherein the plurality of configuration samples in each sampling step, are determined in parallel by using at least one graphics processing unit of the motion planning system, wherein sequences of configuration samples are calculated from all configuration samples by predefined motion criteria, and wherein the calculated sequences of configuration samples are provided as vehicle trajectories for motion of the vehicle.

10 Claims, 3 Drawing Sheets

(56) References Cited

U.S. PATENT DOCUMENTS

2020/0331476 A1 10/2020 Chen et al.
2022/0404829 A1* 12/2022 Nister .................. G05D 1/0212

* cited by examiner

MOTION PLANNING OF AN AUTONOMOUS VEHICLE, MOTION PLANNING SYSTEM AND VEHICLE WITH A MOTION PLANNING SYSTEM

BACKGROUND

Technical Field

The disclosure is concerned with a method for motion planning of an autonomous vehicle, a motion planning system and a vehicle with such a motion planning system.

Description of the Related Art

Multiple strategies for motion planning or trajectory planning are known. In particular, sampling-based algorithms have proven to be beneficial. However, a plurality of problems for autonomous driving are not addressed properly, especially real-time application of these approaches or post sampling maneuver decision. Currently mostly maneuvers are predefined before the sampling to limit and adapt the amount of sampling points to this pre-selected maneuver. For example, in current approaches a heuristic that prioritize promising areas is used. Therefore, a tactical planner is often used to plan the maneuver before the sampling (e.g., overtaking or parking). However, if no solution for this preselected maneuver can be found the planning often fails and a user must intervene because other maneuvers were not considered. Thus, for autonomous driving a decision of the maneuver after assessing all possibilities is advantageous.

In sampling-based approaches, the result is highly dependent of the number of the sampling points. However, a calculation of a large amount of sampling points often prevent a real-time application of these approaches because either the sampling is too time-consuming, or not applicable in the plurality of scenarios because there are too few sample points.

From US 2016/0375901 A1 a method for controlling a semi-autonomous vehicle is known. The method modifies the current path for the vehicle desired by the driver of the vehicle. The current path starts at the current position of the vehicle and ends in a target position of the vehicle and the method modifies the current path while preserving the current position and the target position of the vehicle in the modified path. The method overrides the actions of the driver to control the movement of the vehicle according to the modified path.

In US 2020/0159233 A1 methods and apparatus are disclosed for motion planning of a vehicle. A motion planner uses previous motion graph data included in a motion graph tree and a look-up table to generate candidate trajectories. The motion graph tree is updated with motion graph data associated with the candidate trajectories upon a terminate condition. A trajectory from the candidate trajectories is selected and their control is updated with a trajectory to control the vehicle. A path planner uses previous configuration graph data in the configuration graph tree to generate candidate paths. The configuration graph tree is updated with configuration graph data associated with the candidate's paths upon a terminate condition. The path is selected from the candidate paths. A velocity planner algorithm determines a velocity from the path. A look-up table is used to assist in the velocity determination. A controller is updated with the path and velocity to control the vehicle.

In US 2020/0331476 A1 an autonomous vehicle is disclosed which automatically implements a lane change in dense traffic condition. A minimum distance gap between the vehicle and a vehicle in front of the present vehicle is calculated for an autonomous vehicle, along with a best trajectory for changing lanes into a left adjacent lane or changing lanes into a right adjacent lane. The left or right lane change is triggered by the driver or the global planner that navigates the vehicle. During the next cycle, pre-calculated information is utilized by a planning module to determine the final speed of the trajectory to complete the final planning trajectory for the lane change.

BRIEF SUMMARY

Embodiments of the disclosure provide an improved method for motion planning of an autonomous vehicle.

The disclosure provides a method for motion planning of an autonomous vehicle, wherein the motion planning system determines a plurality of configuration samples through a configuration space using a sampling-based algorithm, wherein the configuration space represents surroundings of the vehicle (e.g., positions where the vehicle could possibly move), and wherein the configuration samples are determined in predefined sampling steps, wherein a sequence of configuration samples defines a possible trajectory and/or path of the vehicle in the configuration space, wherein the plurality of configuration samples in each sampling step are determined in parallel by using at least one graphics processing unit of the motion planning system, wherein sequences of configuration samples are calculated from all configuration samples by predefined motion criteria, and wherein the calculated sequences of configuration samples are provided as vehicle trajectories for moving the vehicle in the surroundings.

In other words, for motion and/or path planning one or more sequences of configuration samples through a configuration space are calculated to provide a vehicle trajectory and/or path, wherein the path comprises the way to travel and the trajectory also comprises a speed and/or time information. The configuration space can be obtained by vehicle sensors and or navigation data of the vehicle. For example, the configuration space can be obtained by a camera, a radar, a LIDAR and/or ultrasound detectors of the vehicle. The configuration space describes the pose of the vehicle, comprising the position an orientation of the vehicle, as well as free space and obstacle space that the vehicle cannot move to. Furthermore, in case of trajectory planning, the configuration space can also comprise a velocity and/or time information.

Then trajectories through this configuration space are tested by generating multiple configuration samples in a plurality of sampling steps, wherein the configuration samples can define milestones between line segments of the trajectory. That is, the configuration samples can represent whether a position in the configuration space is freely accessible or blocked by an obstacle. Furthermore, the configuration samples can comprise velocity information and/or steering angle information for each sampling position to transverse the configuration space.

After the determination of the configuration samples in one sampling step, subsequent configuration samples can be calculated for the next sampling step, wherein the subsequent samples are based on the previously calculated samples. This is performed for all possible motions based on the previous state, to obtain a full spatial coverage. Thus, the amount of configuration samples is increased over each sample step, especially exponentially. To handle this amount of configuration samples at least one, preferably multiple, graphic processing units are used to compute multiple configuration samples in parallel. A graphics processing unit is a dedicated electronic circuit designed to rapidly manipulate and alter memory to accelerate calculations.

Finally, out of all configuration samples sequences are computed by predefined motion criteria to obtain possible vehicle trajectories for motion of the vehicle. Then, from all possible vehicle trajectories a maneuver can be selected an executed by the vehicle. The predefined motion criteria can comprise a distance to target, a distance to an object, a velocity to reach the target and/or the fastest way to a parking position. Preferably, the sequences of configuration samples can be determined by optimizing a cost function that uses the aforementioned motion criteria.

The motion planning system that processes the method can comprise a computing device, preferably a vehicle control unit that at least comprises one dedicated graphics processing unit.

The advantage of the disclosure is that parallel computation of the configuration samples can provide a massive database of scan points in real time. Thereby an improved decision-making can be obtained for the subsequent maneuver planning, as full spatial coverage of possible movements can be used to determine the vehicle motion, rather than only movements in a preselected direction as in previously known approaches.

The disclosure also comprises embodiments that provide features, which afford additional technical advantages.

In one embodiment, it is provided that after each sampling step multiple sequences of configuration samples with the same end state are clustered and only one sequence of the multiple sequences is processed further in the following sampling steps, wherein the one sequence of the multiple sequences is selected by the predefined motion criteria. That is, dynamic programming is performed so that multiple sequences are reduced to sub-problems to be solved. By reducing the sequences with the same end state to only one trajectory found by the optimization an acceleration of the path planning and an improved real-time computation of vehicle trajectories can be obtained. Furthermore, the total configuration space coverage can be maintained.

In another embodiment, the configuration space is rasterized in dependence on environmental information of the vehicle, wherein after each sampling step each grid field of the rasterized configuration space is rated according to an environmental criteria and every configuration sample in the respective grid field receives the rating according to the environmental criteria. In other words, only one rating-calculation of each grid field can be determined and used for all configuration samples in that grid field. The rating may then be used in the assessment of the sequences of configuration samples by the motion criteria. This gives a time advantage, since many trajectories can transverse through the same grid field. An environmental information can comprise a texture or condition of a surface, in particular if a surface is on the road or beside the road, wherein the environmental information can be obtained by a vehicle sensor or digital maps from a navigation system.

Preferably, the environmental criteria comprises a distance to a route, an orientation to the route, a classification of the surface of the grid field and/or a distance to static and/or dynamic objects. For example, the environmental criteria can comprise an information if the grid field is on the roadside, pavement, crosswalk or a counter track. In particular, each grid field can be processed by an optical recognition algorithm, wherein the environmental criteria provides a classification for each surface and/or object in that grid field. Preferably, also dynamic objects are recognized and the motion of these objects are extrapolated to adjacent grid fields. With this embodiment and acceleration and an accuracy of the motion planning can be increased.

In another embodiment, it is provided that, after the provision of the vehicle trajectories, a maneuver for motion of the vehicle is selected and the vehicle is controlled autonomously to perform the maneuver. For example, the maneuver can comprise an overtaking, parking and/or breaking of the vehicle. In contrast to previous sampling-based approaches, the maneuver can be chosen after the provision the vehicle trajectories from a large data basis, wherein in previous approaches, the maneuver was pre-chosen to limit the amount of configuration samples. In particular, massive parallel computation of configuration samples can provide an improved basis for decision-making for autonomous driving.

In a further preferred embodiment, the motion planning system receives static and/or dynamic object information from a vehicle sensor, wherein the object information are included in the configuration space and/or in the calculation by the predefined motion criteria. Furthermore, the static and/or dynamic object information can be included in the environmental criteria. For example, static and/or dynamic object information can comprise traffic participants in the surroundings of the vehicle. This information can be used to set up the configuration space and or to calculate the best trajectory through the configuration space.

Preferably, the motion planning system receives route information from a navigation system of the vehicle, wherein the route information are included in the configuration space and/or in the calculation by the predefined motion criteria. That means that alternatively or additionally route information, especially from a digital map, can be used to obtain the configuration space and the sequence of configuration samples through the space. For example, a current vehicle position can be determined by a positioning sensor, especially a GPS sensor, and route information of the current position can be retrieved by the navigation system and provided to the motion planning system. Therefore, an improvement in accuracy of the method can be achieved.

In another embodiment, the calculation of sequences of configuration samples with the predefined motion criteria comprises an optimization of a cost function. In other words, a cost function or loss function can be optimized to estimate the best trajectory through the configuration space, wherein the trajectories are optimized with respect to the predefined motion criteria. For example, the cost function can be optimized based on a travel distance, uniformity of movement, comfort and/or safety. This embodiment can improve the calculation of the most suitable sequences of configuration samples.

Another aspect of the disclosure relates to a motion planning system configured to perform the method according to any one of the preceding embodiments. In this aspect of the disclosure, the same advantages and variations arise as in the method.

According to the disclosure, also vehicle with such a motion planning system is provided. The inventive vehicle is preferably designed as a motor vehicle, in particular as a passenger vehicle or a truck, or as a bus or a motorcycle.

The disclosure also comprises embodiments of the inventive motion planning system that comprise features that correspond to features as they have already been described in connection with the embodiments of the inventive method. For this reason, the corresponding features of the embodiments of the inventive motion planning system are not described here again.

The disclosure also comprises the combinations of the features of the different embodiments.

BRIEF DESCRIPTION OF THE SEVERAL VIEWS OF THE DRAWINGS

In the following an exemplary implementation of the disclosure is described.

DETAILED DESCRIPTION

The embodiment explained in the following is a preferred embodiment of the disclosure. However, in the embodiment, the described components of the embodiment each represent individual features of the disclosure which are to be considered independently of each other and which each develop the disclosure also independently of each other and thereby are also to be regarded as a component of the disclosure in individual manner or in another than the shown combination. Furthermore, the described embodiment can also be supplemented by further features of the disclosure already described.

In the figures identical reference signs indicate elements that provide the same function.

Figure 1:
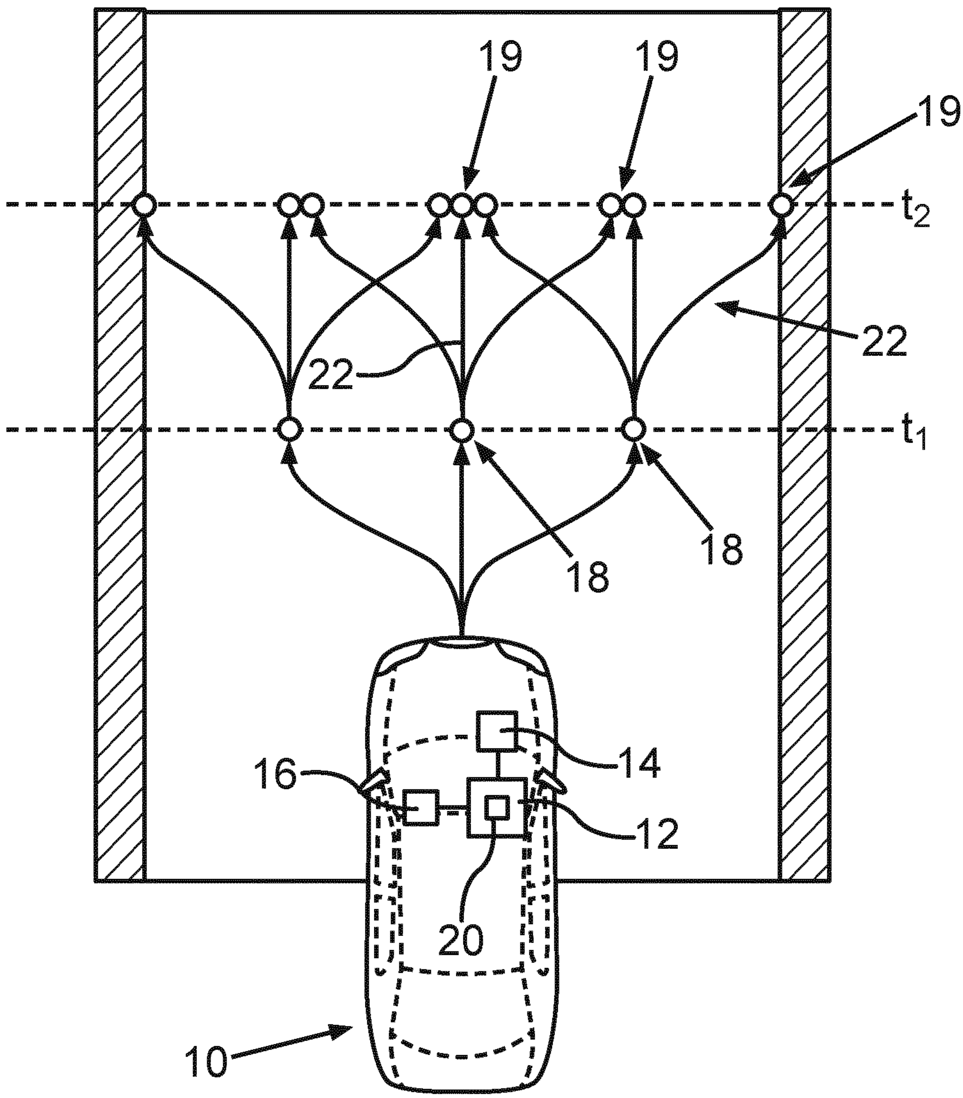
FIG. 1 shows a schematic illustration of an embodiment of the inventive motor vehicle.

FIG. 1 shows a schematic illustration of an embodiment of a motor vehicle 10. The motor vehicle 10 comprises a motion planning system 12 for motion planning of the vehicle 10, wherein the motion planning system 12 may also be configured to control a movement of the vehicle 10. For planning a trajectory, the motion planning system 12 may first determine a configuration space in the vicinity of the vehicle 10.

For example, the configuration space can be assessed by a vehicle sensor 14, wherein the vehicle sensor 14 can comprise a camera, a radar and/or a LIDAR. Furthermore, the configuration space can be obtained by route information assessed from navigation system 16.

To provide vehicle trajectory for motion of the vehicle 10 the motion planning system 12 can determine a plurality of configuration samples 18, 19, wherein configuration samples 18, 19 are sampled in a plurality of predefined sampling steps $t_1$, $t_2$. Preferably, the configuration samples can be determined from near to far distance in each subsequent sampling step $t_1$, $t_2$. That is, first the configuration samples 18 in sampling step $t_1$ are computed and then, originating from these samples, the subsequent configuration samples 19 are computed in the following sampling step $t_2$. Preferably up to thirty sampling steps or more may be calculated to provide all possible trajectories.

In order to provide sufficient configuration samples in real time, which is a prerequisite for autonomous driving, the motion planning system 12 preferably comprises one or more graphic processing units 20 capable of fast massive calculation of configuration samples by computing a plurality of configuration samples in parallel. For example, 100, 000 sampling points can be determined in parallel to create a desired data basis for all possible vehicle trajectories.

From these configuration samples 18, 19 one or more sequences 22 are calculated using predefined motion criteria. These sequences then can be provided as vehicle trajectories for movement of the vehicle 10. To determine the sequences 22 preferably the motion criteria are optimized in a cost function. For example, the sequences can be determined in terms of the fastest and/or shortest route through the configuration space while maintaining vehicle safety. Finally, a maneuver for motion of the vehicle can be selected from these sequences by the motion planning system 12 depending of the desired action, such as overtaking or parking, and the vehicle 10 can be autonomously controlled to perform this maneuver.

To further accelerate the sampling-based algorithm shown above, the motion planning system 12 may utilize further acceleration methods, which are explained in the following figures.

Figure 2:
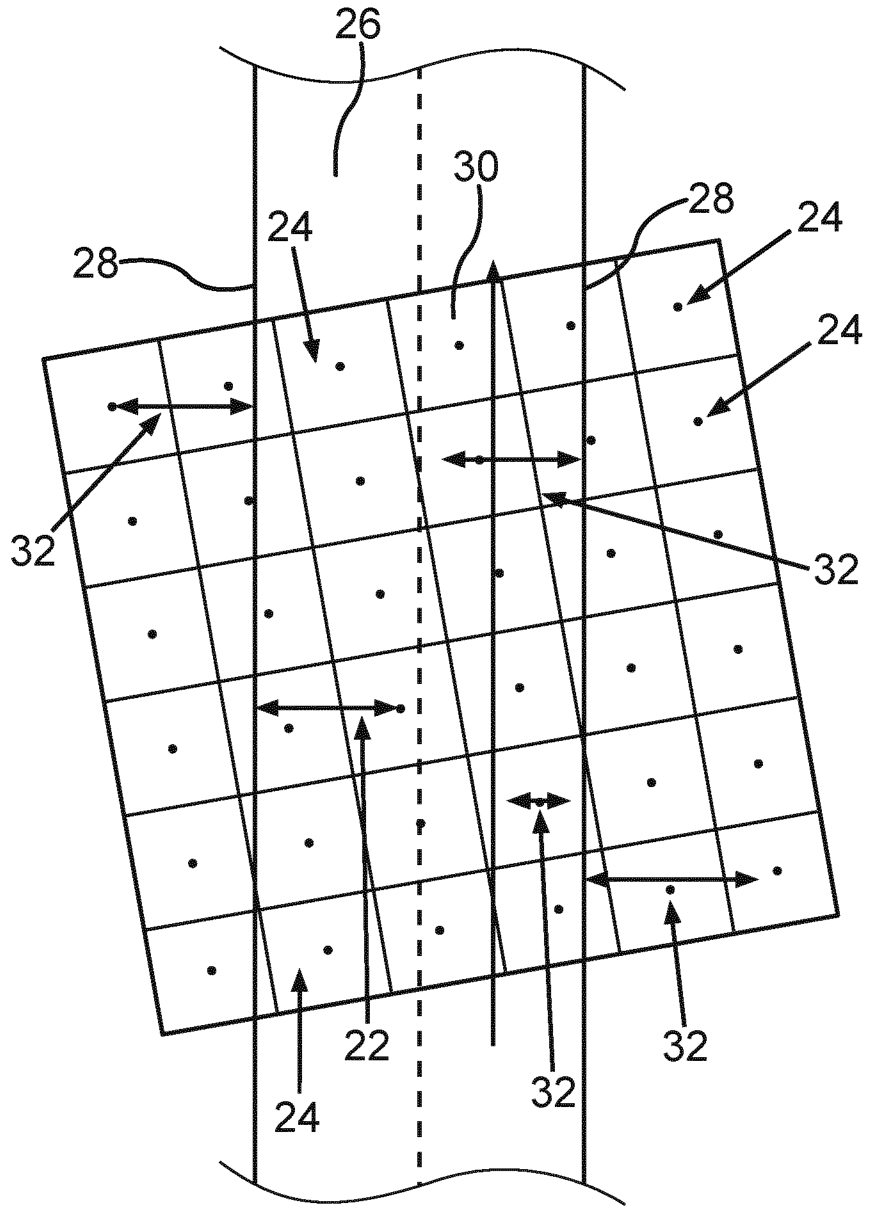
FIG. 2 shows a schematic illustration of a motion planning strategy.

In FIG. 2 a schematic illustration of a configuration space is shown, wherein the configuration space is rasterized, respectively divided, in several grid fields 24, wherein each grid field 24 can be rated in dependence on an environmental information.

For example, FIG. 2 depicts a road 26 with a road limitation 28 and the centerline 30 on the road. Each grid field 24 may comprise multiple configuration samples, which are not shown in this figure. According to environmental criteria, each grid field 24 can be rated and each configuration sample in the respective grid field 24 can receive the rating of the respective grid field. For example, a Euclidian distance 32 to the road limitation 28 can be calculated for each grid field 24 and for simplification of the sampling algorithm, each configuration sample in the respective grid field can receive this mean Euclidian distance. Consequently, faster calculation of the vehicle trajectories can be obtained. The size of the grid fields can be adapted according to calculation power of the motion planning system 12, in particular to the amount of computing operations of the graphics processing unit 20. For example, the higher the computing power of the motion planning system 12, the smaller the grid fields can be chosen.

Figure 3:
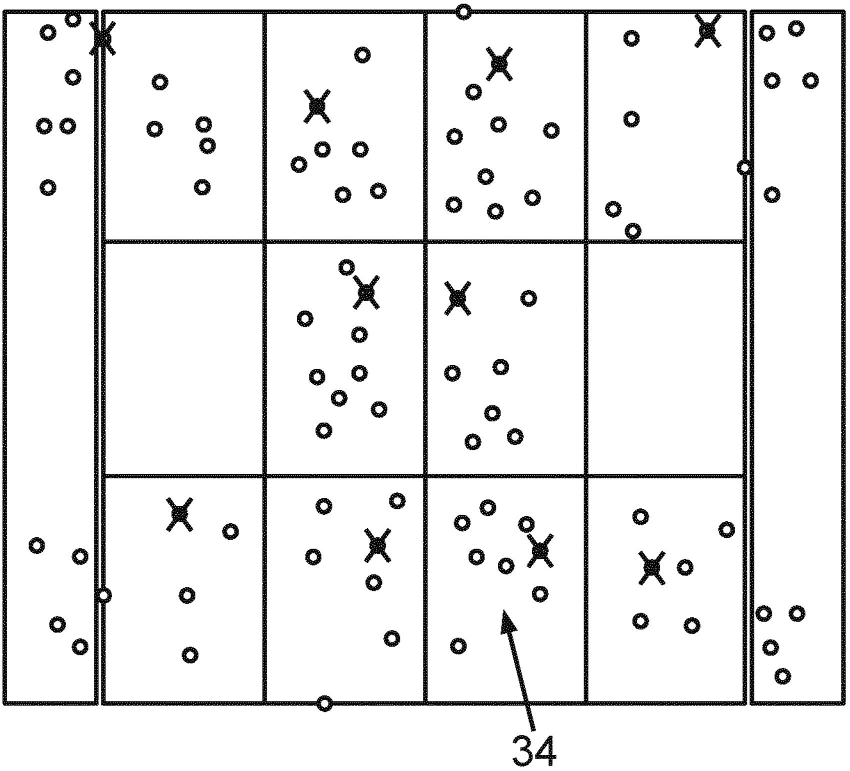
FIG. 3 shows a schematic illustration of another motion planning strategy.

Another method to accelerate the sampling-based algorithm is shown schematically in FIG. 3.

In this acceleration approach, multiple configuration samples in each sampling step with the same end state are clustered. For example, FIG. 3 shows a simplified state space, wherein each point can represent several properties of the vehicle motion that are sampled by the motion planning system. For instance, the points in field 34 are recognized as having one common end state and are clustered. From these clustered points, only the one configuration sample (cross) that best satisfies the predefined motion criteria is then selected for further processing. That is, in the next sampling step $t_2$ only configuration samples originating from this configuration sample (cross) are computed. Thus, an exponential growth can be decelerated to a linear growth. It should be noted that the state space shown in FIG. 3 is a simplified representation in 2D and only serves for illustration purposes. The state space may be much bigger and may further comprise more dimensions, like an orientation, velocity and steering angle of the vehicle.

Overall, the examples show how a maneuver can be selected from a wide data basis of all possible trajectories, wherein the sampling-based algorithm can be performed in real-time, providing an opportunity for Level 4 autonomous driving.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for motion planning of an autonomous vehicle, performed by a motion planning system, the method comprising:

determining a plurality of configuration samples through a configuration space using a sampling-based algorithm, wherein the configuration space represents surroundings of the vehicle, wherein the configuration samples are determined in predefined sampling steps, wherein a sequence of the configuration samples defines a possible trajectory or path of the vehicle in the configuration space, and wherein the configuration samples in each of the sampling steps are determined in parallel by using at least one graphics processing unit of the motion planning system;

calculating sequences of the configuration samples from the configuration samples by predefined motion criteria;

receiving a current vehicle position determined by a positioning sensor of the vehicle;

receiving route information from a navigation system of the vehicle based on the current vehicle position, wherein the route information is different from the current vehicle position;

including the route information in the configuration space or in a calculation by the predefined motion criteria, wherein the predefined motion criteria include at least one of a distance to a target, a distance to an object, a velocity to reach the target, or a fastest way to a parking position;

outputting the sequences of the configuration samples as vehicle trajectories for moving the vehicle in the surroundings of the vehicle;

rasterizing the configuration space based on environmental information of the vehicle, wherein the configuration space is divided into a plurality of grid fields that form a rasterized configuration space, and wherein the environmental information of the vehicle includes information regarding a surface on a road or beside the road; and after each of the sampling steps, determining a rating for each grid field of the plurality of grid fields of the rasterized configuration space according to environmental criteria, wherein each grid field of the grid fields comprises two or more of the configuration samples, and wherein each of the two or more of the configuration samples comprising each grid field of the grid fields receives the rating determined for the grid field according to the environmental criteria.

2. The method according to claim 1, further comprising:

after each of the sampling steps, clustering one or more of the sequences of the configuration samples with a same end state, wherein only one sequence of the one or more of the sequences of the configuration samples is processed further in the subsequent ones of the sampling steps, and wherein the one sequence of the one or more of the sequences of the configuration samples is selected by the predefined motion criteria.

3. The method according to claim 1, wherein the environmental criteria includes a classification of the surface and a Euclidian distance to a road limitation.

4. The method according to claim 1, further comprising:

after the vehicle trajectories are output, selecting a maneuver for the motion of the vehicle, wherein the maneuver comprises an overtaking, parking and/or breaking of the vehicle; and controlling the vehicle to perform the maneuver.

5. The method according to claim 1, further comprising:

receiving static or dynamic object information from a vehicle sensor; and including the static or dynamic object information in the configuration space or in a calculation by the predefined motion criteria.

6. The method according to claim 1, wherein the calculating the sequences of the configuration samples with the predefined motion criteria includes optimizing a cost function.

7. A motion planning system comprising:

at least one processor; and at least on memory storing instructions that, when executed by the at least one processor causes the motion planning system to:

determine a plurality of configuration samples through a configuration space using a sampling-based algorithm, wherein the configuration space represents surroundings of a vehicle, wherein the configuration samples are determined in predefined sampling steps, wherein a sequence of the configuration samples defines a possible trajectory or path of the vehicle in the configuration space, and wherein the configuration samples in each of the sampling steps are determined in parallel by using at least one graphics processing unit of the motion planning system;

calculate sequences of the configuration samples from the configuration samples by predefined motion criteria;

receive a current vehicle position determined by a positioning sensor of the vehicle;

receive route information from a navigation system of the vehicle based on the current vehicle position, wherein the route information is different from the current vehicle position;

include the route information in the configuration space or in a calculation by the predefined motion criteria, wherein the predefined motion criteria include at least one of a distance to a target, a distance to an object, a velocity to reach the target, or a fastest way to a parking position;

output the sequences of the configuration samples as vehicle trajectories for moving the vehicle in the surroundings of the vehicle;

rasterize the configuration space based on environmental information of the vehicle, wherein the configuration space is divided into a plurality of grid fields that form a rasterized configuration space, and wherein the environmental information of the vehicle includes information regarding a surface on a road or beside the road; and after each of the sampling steps, determine a rating for each grid field of the plurality of grid fields of the rasterized configuration space according to environmental criteria, wherein each grid field of the grid fields comprises two or more of the configuration samples, and wherein each of the two or more of the configuration samples comprising each grid field of the grid field receives the rating determined for the grid field according to the environmental criteria.

8. A vehicle with the motion planning system according to claim 7.

9. The motion planning system according to claim 7, wherein the environmental information of the vehicle includes information regarding a texture or a condition of the surface on the road or beside the road.

10. The method according to claim 1, wherein the environmental information of the vehicle includes information regarding a texture or a condition of the surface on the road or beside the road.

* * * * *